(No Model.)

O. H. JEWELL.
SCREEN FOR FILTERS.

No. 572,606. Patented Dec. 8, 1896.

Witnesses
Wm. M. Rheem
Wm. F. Huning

Inventor
Omar H. Jewell,
By his Attorneys
Bond Adams Pickard Jackson.

UNITED STATES PATENT OFFICE.

OMAR H. JEWELL, OF CHICAGO, ILLINOIS, ASSIGNOR TO THE O. H. JEWELL FILTER COMPANY, OF SAME PLACE.

SCREEN FOR FILTERS.

SPECIFICATION forming part of Letters Patent No. 572,606, dated December 8, 1896.

Application filed April 7, 1896. Serial No. 586,610. (No model.)

*To all whom it may concern:*

Be it known that I, OMAR H. JEWELL, a citizen of the United States, residing in Chicago, in the county of Cook and State of Illinois, have invented certain new and useful Improvements in Screens for Filters, of which the following is a specification, reference being had to the accompanying drawings, in which—

Figure 2:
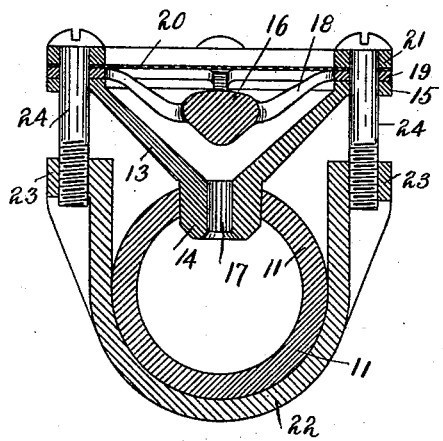
Figure 3:
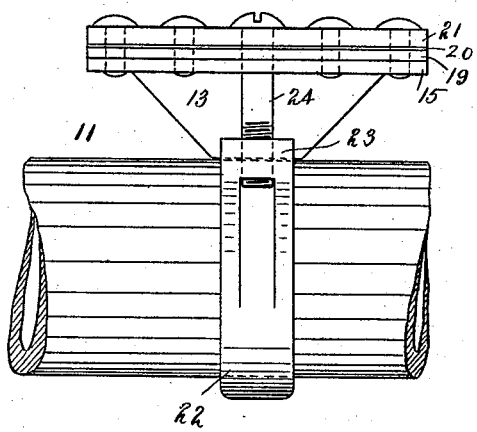
Figure 1:
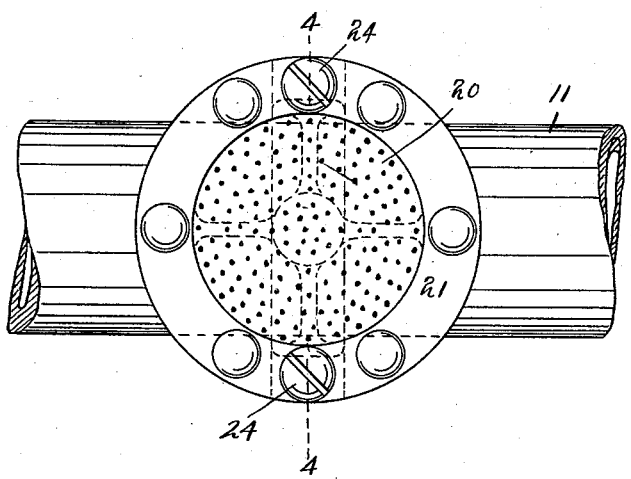

Figure 1 is a plan view of one of my improved strainers and the pipe to which it is secured. Fig. 2 is a vertical cross-section on line 4 4 of Fig. 1. Fig. 3 is a side elevation of the parts shown in Fig. 2.

My invention relates to screens for filters, and particularly to screens for filters of the class commonly used for filtering large bodies of water for potable and other purposes in which the water is filtered through a granular filter-bed contained in a suitable receptacle, and such, for example, as is shown in Letters Patent granted to me September 24, 1895, and numbered 546,738.

My invention has for its object to provide various improvements in screens for filters of this class, as will be more fully hereinafter pointed out.

That which I regard as new and as of my invention will be set forth in the claim.

In the drawings, 13 (see Fig. 2) indicates the body of the strainer, which is conical in shape and is provided with a projection 14 at its apex which is adapted to fit into a suitable opening in the branch pipe 11. The projection 14 is preferably smooth and fits snugly in place; but it may be screw-threaded, if desired. The base 15 of the body 13 is flattened, and upon it rests a deflector 16, secured centrally over a passage 17, through the projection 14, by arms 18, which are connected to a ring 19, adapted to fit upon the base 15, as shown in Fig. 2.

20 indicates a screen adapted to be secured over the ring 19.

21 indicates a binding-ring adapted to be secured over the screen upon the ring 19, thereby holding the screen in place.

22 indicates a U-shaped yoke or clip adapted to embrace the pipe 11, and having bosses 23 at its ends adapted to receive bolts 24, which pass through the base 15 and rings 19 and 21, as shown in Fig. 2. By this construction the body 13 of the strainer with the rings which it carries may be tightly bound upon the pipe. This construction is much more efficient than the screw-threaded construction by which strainers have heretofore been secured to pipes, as in the latter construction the corroding of the screw-threads under the action of the water loosened the strainers and caused leakage. In the present construction, however, there are no screw-threads which are exposed to the action of the water, and consequently the strainers are tightly held in place. Furthermore, this construction is not affected by the jarring of the water, as is frequently the case in other constructions. The strainer is also much more efficient than prior constructions, for the reason that the deflector with which it is provided diverts the water from a direct course, spreading it more uniformly over the screen in washing, thereby preventing the water from destroying the screen, as is the case where no such deflector is provided.

It will be obvious that instead of providing the strainer-body with a projection and the pipe 11 with an opening to receive it, as herein described, the arrangement of parts may be reversed, although the form shown is that which I prefer.

Although I have described in detail the invention for securing the strainer-body to the pipe, I do not wish to be limited to such specific means, as many modifications may be made without departing from the spirit of my invention.

That which I claim as my invention, and desire to secure by Letters Patent, is—

In a strainer, the combination with a body, having a base 15, of a ring 19, a deflector supported thereby, and a ring 21, substantially as and for the purpose specified.

OMAR H. JEWELL.

Witnesses:
JOHN L. JACKSON,
ALBERT H. ADAMS.